United States Patent [19]

Pennington et al.

[11] 4,264,921
[45] Apr. 28, 1981

[54] APPARATUS FOR COLOR OR PANCHROMATIC IMAGING

[75] Inventors: Keith S. Pennington; Eugene S. Schlig, both of Somers, N.Y.; James M. White, Charlotte, N.C.

[73] Assignee: International Business Machines Corporation, Armonk, N.Y.

[21] Appl. No.: 53,485

[22] Filed: Jun. 29, 1979

[51] Int. Cl.³ .............................................. H04N 9/04
[52] U.S. Cl. ........................................ 358/50; 358/75; 358/78
[58] Field of Search ..................... 358/41, 44, 50, 75, 358/78, 55, 48

[56] References Cited

U.S. PATENT DOCUMENTS

| | | | |
|---|---|---|---|
| 2,422,778 | 6/1947 | Finch | 358/75 |
| 3,942,154 | 3/1976 | Akami | 358/78 |
| 3,975,760 | 8/1976 | Yamanaka | 358/50 |
| 4,007,488 | 2/1977 | Morishita | 358/41 |
| 4,012,587 | 3/1977 | Ochi | 358/50 |
| 4,054,915 | 10/1977 | Sugihara | 358/41 |

FOREIGN PATENT DOCUMENTS 2719208 11/1977 Fed. Rep. of Germany ............. 358/50
1525062 9/1978 United Kingdom ....................... 358/41

OTHER PUBLICATIONS

A Color Camera Using Three Area Scan CCD, Inove et al., NEC R&D, No. 42, pp. 71–79, Jul. 1976.

*Primary Examiner*—Jin F. Ng
*Assistant Examiner*—Michael A. Masinick

[57] ABSTRACT

A color facsimile transmission apparatus wherein a beam of white light is dispersed into component colors by a prism. The color dispersed bands of illumination are focused to irradiate a portion of a moving document. The reflected, colored light from the document is focused on the surface of three charge coupled devices (CCDs) so that the red illuminating band irradiates a first CCD and the green and blue bands respectively irradiate the second and third CCDs. The movement of the document causes each line of the document to scroll through the illuminating band over each of the CCDs. The CCDs are operated in the time delay and integration mode to generate charge packets corresponding to the picture elements of the red, green and blue component line images of each line of the document.

22 Claims, 5 Drawing Figures

APPARATUS FOR COLOR OR PANCHROMATIC IMAGING

TECHNICAL FIELD

The invention relates to imaging apparatus and, more particularly, to such apparatus including charge coupled devices for generating electrical signals corresponding to the radiation intensity of an incident light image.

BACKGROUND ART

As shown in the U.S. patent to W. G. H. Finch, U.S. Pat. No. 2,422,788, it is known in the art of facsimile transmission ot employ a prism to generte a color-dispersed band of light from a polychromatic point illuminating source and to use focused portions of the band of light to sequentially scan successive lines of a source document; first by illuminating a document with a spot of one color and subsequently by illuminating with spots of two additional colors. For such an imaging system, a photo-electric cell, responsive to light impulses over the entire spectrum, is employed to generate an electrical signal that is proportional to the intensity of the scanning light. Thus, separate electrical signals corresponding to the separate color components of the lines of the source document are generated.

However, such a prior art facsimile transmission apparatus necessarily requires a plurality of scans of each line of a source document and, therefore, is rather slow in operation. Also, the moving prism further reduces the speed, efficiency and reliability of the apparatus.

It is also known in the color facsimile transmission art to employ red, green and blue filters to produce color component images of a corresponding incident polychromatic primary image. In such systems, the component images are applied to irradiate corresponding photodetectors that generate electrical signals that are proportional to the intensity of the light of each of the images. It has also been suggested to vary the size of such color filters in order to compensate for the sensitivity of the photodetectors to particular wavelengths of light. However, such prior art filter imaging systems necessarily require a relatively intense polychromatic primary image. Also, such systems waste a relatively large amount of the radiation intensity of the polychromatic image by filtering out unwanted color components.

It is known to use charge coupled devices (CCDs) to generate packets of charge that correspond to picture elements (pixels) of an incident light image.

For color imaging, it is also known to employ three CCD arrays to provide electrical signals corresponding to the intensities of the red, green and blue color components of a polychromatic image. For example, such CCD imaging apparatus is disclosed in the patent to Morishita et al, U.S. Pat. No. 4,007,488.

In the patent to Morishita it is suggested that the charge accumulation time of a frame transfer imaging CCD may be adjusted in inverse relation to the sensitivity of the CCD to the wavelength of incident light. Thus, the electrical output of each adjusted CCD is a function of the intensity of the incident light and not the wavelength of the light. However, the apparatus of Morishita requires relatively expensive beam splitters and other optical components to apply a separate filtered image to each of the CCDs. In addition, the optical apparatus of Morishita requires rather precise alignment.

It is known in the CCD imaging art to operate a CCD array of imaging elements in a time delay and integration (TDI) mode. For example, the publication, David F. Barbe, "Imaging Devices Using the Charge Coupled Concept", Proc. IEEE, Vol. 63, pp. 38-67 (January, 1975) describes a TDI system. In the TDI mode, an incident light image is scanned across rows of cells of the parallel registers of a particular CCD array and the parallel registers of the array are synchronously gated so that a plurality of charge packets corresponding to the pixels of the image accumulate under the image as the image moves over the parallel registers. After the image has moved the length of the parallel registers of the CCD array, the accumulated charges are passed to a serial register and are thereafter gated from the serial register.

Although the TDI operation of CCDs is known to the art, CCDs have not heretofore been operated in the TDI mode to provide electrical signals corresponding to the color components of a polychromatic image.

Accordingly, it is a primary object of the invention to provide a relatively simple and inexpensive imaging apparatus that uses a plurality of CCD arrays operated in a time delay and integration mode to generate signals corresponding to the pixels of optical components of a primary image.

Another object of the invention is to provide such an apparatus wherein the number of cells in the parallel registers of the imaging CCD arrays are varied to compensate for the sensitivity of each CCD to a particular wavelength of incident light.

A further object of the invention is to provide a simple, reliable and less expensive color facsimile transmission apparatus that employs a prism or grating to irradiate a source document with a band of color-dispersed illumination which is then imaged onto a plurality of photosensitive CCDs.

Another object of the invention is to provide an easily aligned imaging apparatus by using a plurality of pre-aligned arrays that are formed on a single chip or mounted on a substrate.

DISCLOSURE OF THE INVENTION

In order to achieve the objects of the invention and to overcome the problems of the prior art, the color facsimile transmission apparatus, according to the invention, includes means for generating an illuminating beam of white light. The white light is dispersed into colored bands of illumination by a prism or grating and the colored bands of illumination are focused to irradiate a portion of a relatively moving document. The reflected, colored light from the document is focused on the surface of three CCD arrays so that the red band of illumination irradiates a first array and the green and blue bands respectively irradiate the second and third arrays.

A moving image of each line of the document scrolls through the illuminating bands over each of the CCD arrays and the arrays are operated in a time delay and intergration (TDI) mode to generate charge packets that correspond to the picture elements of the red, green and blue scanning images. The depths of the parallel register, (i.e., the number of its cells) of each array is inversely proportional to the sensitivity of the array to the wavelength of the incident light.

An alternate embodiment of the invention utilizes red, green and blue filters to select the color components of an image of an object that is irradiated by white light. The relative movement of the object and the scanning apparatus causes a color component image to be successively scanned across three CCD color imaging arrays.

BEST MODE FOR CARRYING OUT THE INVENTION

Figure 1:
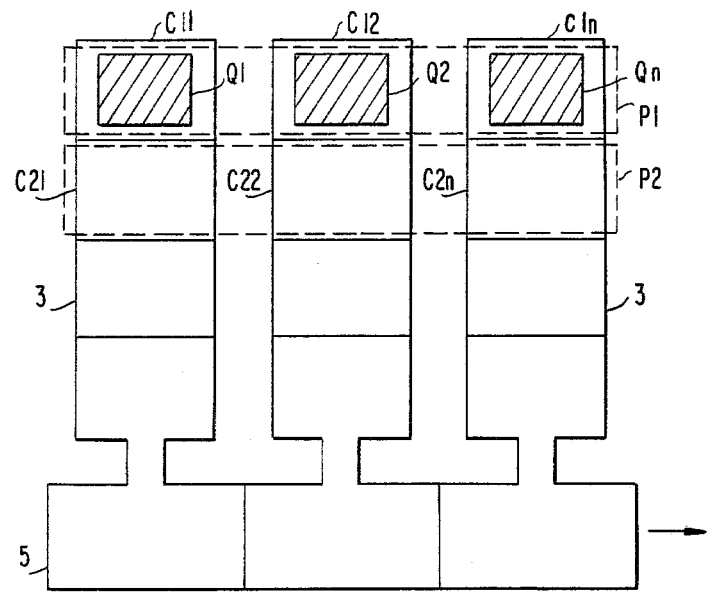
FIG. 1 shows a diagrammatic illustration of a prior art charge coupled imaging device that is operated in a time delay and integration mode.

The remaining portion of this specification will describe preferred embodiments of the invention when read in conjunction with the attached drawings, in which like reference characters identify identical apparatus.

FIG. 1 is a diagrammatic illustration of a prior art charge coupled device (CCD) that is operated in a time delay and integration (TDI) mode to generate electrical signals corresponding to the intensity of incident light. More particularly, a CCD array 1 is comprised of a plurality of vertically oriented parallel shift registers 3, each register defining a vertical column of resolution elements or cells that operate in a manner known to the art to convert incident light energy to a corresponding electric charge. As is known to those skilled in the art, the quantity of electric charge that is generated at a cell is, within known saturation limits, proportional to the intensity of the incident light and the time during which the incident light irradiates the cell of the CCD.

In a TDI system, a light image is initially positioned at an image position P1 to irradiate corresponding cells C11, C12 and C1n of the parallel registers 3. The imaging cells of the parallel registers respond to the incident light energy by generating corresponding charge packets Q1, Q2 and Qn. Of course, each charge packet corresponds to a particular picture element or pixel of the light image that is located at the image position P1.

Thereafter, the irradiating image is moved to a next successive position P2 and the charge packets Q1, Q2 and Q3 that were accumulated at the cells C11, C12 and C13 are simultaneously gated to adjacent cells C21, C22 and C23 of the parallel registers 3. Of course, the cells C21, C22 and C23 respond to the radiation of the image at the position P2 by generating corresponding electrical charges that add to the charges Q1, Q2 and Q3. Thus, as the image is moved to successive rows of cells of the parallel registers, the associated charge pacckets are also synchronously gated along with the moving image to provide accumulated charges that correspond to the intensity of incident light at each pixel of the image.

When the image is moved to the last row of cells of the parallel registers, the associated accumulated charge packets are gated to corresponding positons of a serial register 5. Thereafter, the image is moved out of the CCD array and the accumulated charges are serially gated from the serial register.

It should be understood that a plurality of line images may be simultaneously moved over the parallel registers of the CCD array 1, provided that the corresponding charge packets that are accumulated at each row of cells are gated to the next successive row of cells before a preceding row of charge packets is gated. Thus, it should be appreciated that in a TDI system, the amount of the accumulated charge for the pixels of a particular image is proportional, within the saturation parameters of the CCD, to the intensity of the radiation of the image and to the distance over which the image must travel to accumulate charge for each pixel.

In general, for TDI operation, the distance between successive arrays must be precisely defined so that the gating of each array is synchronized with the movement of an image into the first row of cells of the parallel register portion of the array. For convenience and minimum cost, the arrays may be positioned so that the same clock phases may be applied to the parallel register portions of all of the arrays.

Figure 2:
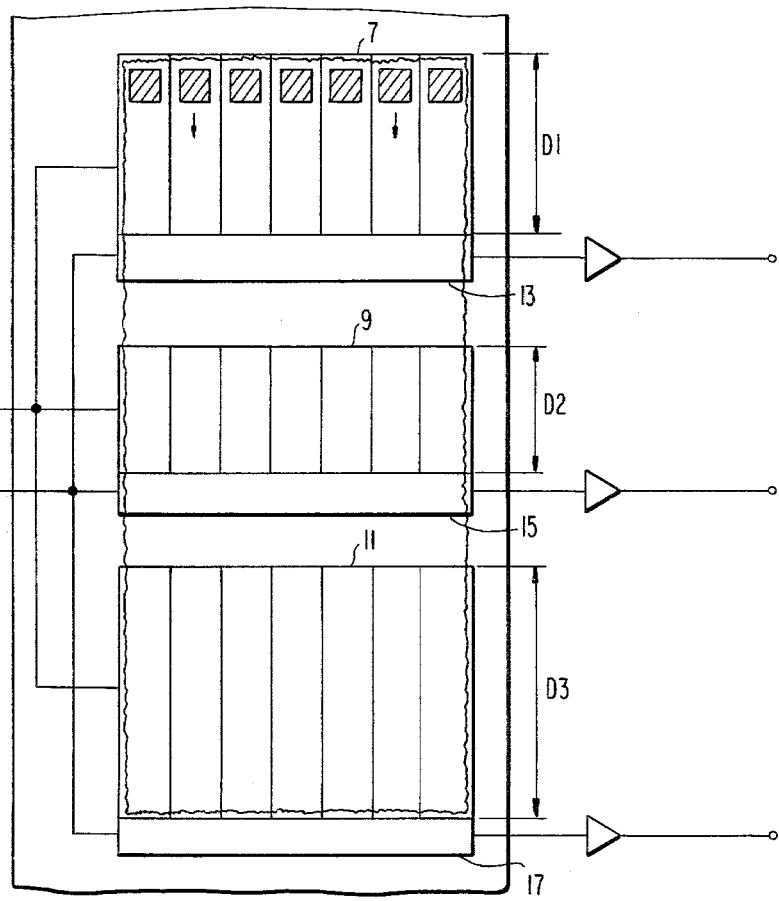
FIG. 2 illustrates a block diagram of three charge coupled devices having different depths for their associated parallel registers.

FIG. 2 illustrates three CCD arrays that may be operated in the TDI mode and in accordance with the invention to provide electrical signals corresponding to the red, green and blue color components of a polychromatic image.

In operation, a red component image of the polychromatic image is scanned over a distance D1 of the CCD array 7 in the above-described manner to provide accumulated charge packets in the serial register 13, correspnding to the pixels of the red component image. Likewise, a green component image is scanned over a distance D2 of the CCD array 9 to provide accumulated pixel charge packets in the serial register 15 and a corresponding blue component image is scanned over a distace D3 of the CCD array 11 to generate representative accumulated charge packets in the serial register 17.

In accordance with the invention, the distances D1, D2 and D3 of the respective arrays called the depth of the arrays, define the space over which charges are allowed to accumulate in each of the arrays. Of course, as the depth of an array is increased, the time for accumulating a light-induced charge in the array is also increased.

Thus, each of the CCD arrays of FIG. 2 has a depth that is inversely proportional to the sensitivity of the cells of the array to the particular wavelength of the incident light. In general, if the CCDs are most sensitive to green light and are least sensitive to blue light, the green array 9 will have the smallest depth of cells and the blue array 11 will have the greatest depth. The variation in cell depth ensures that the charge packets generated at each CCD are proportional only to the radiation intensity of the associated color component image and are not affected by the relative sensitivity of the CCD to the particcular wavelength of the incident radiation. However, it should be understood that the invention is not limited to particular values of cell depths for the CCD arrays. Also, the cell depths may be varied as a function of something other than the wavelength of incident light, without departing from the spirit of the invention. For example, the depth of an array may be adjusted to provide a greater or lesser spectral coverage.

Figure 3:
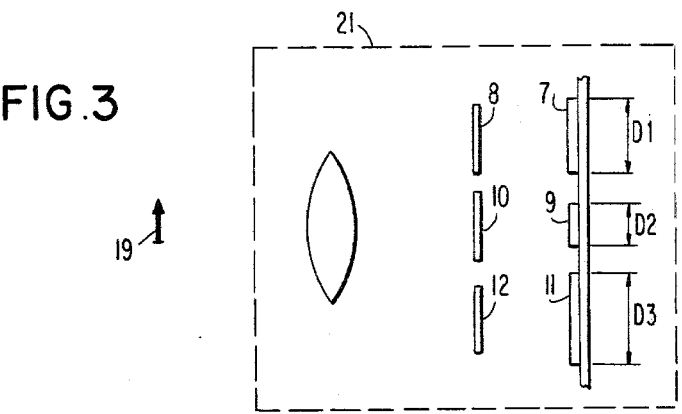
FIG. 3 shows a diagrammatic illustration of a camera imaging apparatus in accordance with the invention.

It should be understood that a color component of an image may be scanned across the CCD arrays of FIG. 2 in any manner known to the art. For example, as shown in FIG. 3, red, green and blue filters 8, 10 and 12 may be placed over the respective arrays 7, 9 and 11 and a moving polychromatic image of an object 19 may be scanned across the filters. Such a color filtering scheme may be appropriate for use in a color camera or other device that is employed to distinguish the color components of a object 19 that is irradiated by white light.

It should be understood that the scanning movement of the image over each of the CCDs may be accomplished by moving either the scanned object 19 or the scanning apparatus 21 or by using an image deflector such as a rotating or translating mirror to scan the image of a stationary object over the CCDs. In addition, it should be appreciated that, in accordance with the invention, a single image may be employed to successively scan the arrays 7, 9 and 11 or a single image may be split to simultaneously scan the arrays.

Figure 4:
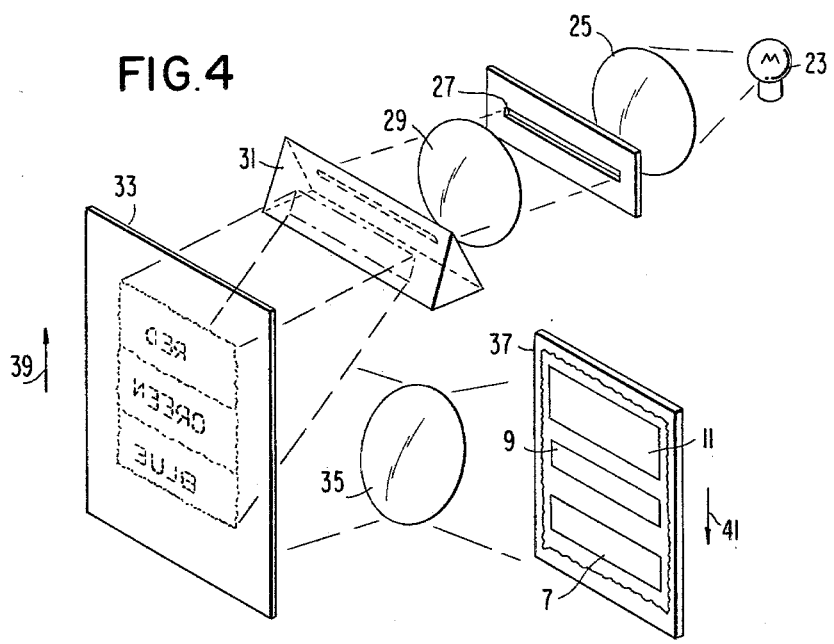
FIG. 4 shows a diagrammatic illustration of a facsimile imaging apparatus in accordance with the invention.

FIG. 4 illustrates a facsimile transmission apparatus that utilizes a color dispersed band of illumination to irradiate a plurality of TDI operated CCDs. More particularly, white light from a source 23 is focused by a lens 25 to irradiate a slit 27. The light of the slit is again focused by a lens 29 to irradiate a prism 31. The prism 31 disperses the incident white light into a band of color dispersed light comprised of a plurality of spectral sub-bands and directs the dispersed band of light to illuminate an object, for example, a source document 33. It should be understood that other radiation dispersing apparatus, for example, a grating, may be employed without departing from the invention.

The spectrally dispersed sub-bands of radiation are reflected from the surface of the source document 33 and are focused by a lens 35 onto an imaging device, for example, a silicon chip having three CCD imaging arrays. As shown in FIG. 4, the red band of illumination is positioned over the CCD array 7 and the green and blue illuminating bands are respectively positioned over the CCD arrays 9 and 11.

As the source document 33 is moved in the direction of the arrow 39, each line of the source document 33 is successively illuminated by the red, green and blue bands of light. Thus, each line appears to scroll across the CCD imaging device 37 in the direction indicated by the arrow 41.

As explained previously, as the red image of a particular line moves over the CCD array 7, corresponding charge packets are sychronously gated in the array so that when the image completes its scan of the array 7, a serial register 13 of the array contains charge packets corresponding to the pixels of the red image of the line. Likewise, the line image is scanned over the green and blue arrays to produce corresponding charge packets for the pixels of the green and blue component images of the line.

The gating of charge packets in the CCD arrays and the movement of the source document 33 is continuous so that each successive line scans across the red, green and blue arrays and the associated charge packets move with each line and are gated out of each array in a serial sequence. Of course, if the CCD arrays are sequentially scanned, it is necessary to delay the pixel signals for the red and green image components of a line in order to combine the red, green and blue pixels of the line.

It is an important feature of the apparatus of FIG. 4 that the separate red, green and blue CCD imaging arrays are positioned on a single chip or are aligned on a substrate in the precise fashion allowed in an integrated circuit manufacturing process. Thus, such mutliple, pre-aligned imaging arrays may be quickly and easily aligned with the illuminating band of radiation.

It should also be understood that the use of color dispersed illuminating bands of light in combination with a plurality of pre-aligned arrays is desirable for an imaging apparatus since complex and expensive optical elements are not required to split a source image.

Although the CCD arrays of FIGS. 2 and 4 have been shown in horizontal and vertical alignment, it should be appreciated that the arrays may be slightly displaced with respect to one another in order to provide an interleaving of corresponding red, green and blue pixels, without departing from the spirit of the invention.

Although FIG. 4 indicates that the source document 33 is in motion and the other components are stationary, it should be recognized that other methods are known in the art to obtain the required relative motion 41 of the document image and the imaging device 37. For example, the illuminator components 23, 25, 27, 29 and 31 may be translated parallel to the surface of document 33 in a direction opposite to that of the arrow 39 while apparatus systems of moving mirrors keep the image of the document in focus in the array.

Figure 5:
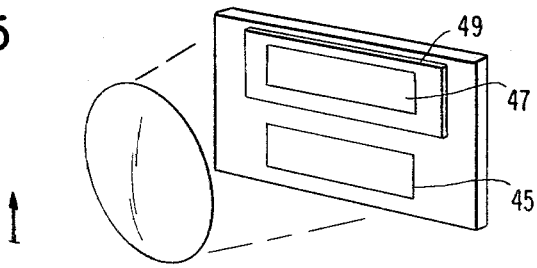
FIG. 5 shows a diagrammatic illustration of an embodiment of a threshold imaging apparatus.

Apparatus in accordance with the invention may also be used for black and white imaging where a panchromatic spectral response or some other particular spectral response is desired. In such a system, the depth of each array and the particular positions of the arrays detemine the magnitude of emphasis or de-emphasis of particular color components of a panchromatic image. Of course, as indicated above, the pixel charge packets emerging from the red array in such an imaging system are delayed, for example, in a CCD delay line, and are combined with the corresponding pixel charge packets of the green array. The combined red and green charge packets are combined with the corresponding pixel charge packets of the blue array to produce an image having the required spectral emphasis. Although multiple, pre-aligned imaging arrays have been described for applications relating to color imaging, it should be appreciated that such arrays may be used for providing electrical signals corresponding to categories of optical information other than color without departing from the spirit of the invention. For example, as shown in FIG. 5, two such imaging arrays may be employed to generate electrical signals corresponding to an in-focus and an out-of-focus image of a scanned object.

In operation, a focused image is scanned across the surface of a first imaging array 45 to generate pixel charge signals corresponding to the radiation intensity of the focused image. After scanning the first array, the image is then moved to scan a second array 47 having a defocusing element, for example, a plate 49 of transparent material, that is positioned over the resolution elements of the array 47. Thus, a defocused image is scanned across the second array 47 and the second array generates pixel signals corresponding to the radiation intensity of the defocused image.

The focused and defocused electrical representations of a particular image may then be used in a manner known to the art to determine the optimum white-black threshold for the focused image. Of course, for such an application, a document or other object is illuminated by a band of white or monochrome light to produce an image that may be scanned by moving the document or by moving the imaging apparatus. Also, it should be understood that for such an application, the cells of the two arrays are the same size so as to provide the same resolution for each array.

It will be appreciated by those skilled in the art that many different kinds of pre-aligned imaging arrays may be employed in accordance with the invention. For example, a CCD linear array, a CCD-scanned linear photodiode array or a self-scanned linear photodiode array may be employed for imaging in the above-described systems, for one or more of the plurality of imaging arrays of a device according to the present invention. In this regard, it should be understood that such a linear imaging array may be thought of as equivalent to a TDI array with a parallel register depth of one cell. Of course, different types of CCD arrays may be used in combination in the above-described imaging systems without departing from the spirit of the invention.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

We claim:

1. An imaging apparatus for providing electrical signals corresponding to different categories of optical information which are generated when at least a part of an object is imaged on an image plane, without using beam splitters or other image splitting means, comprising, at least two imaging arrays formed at aligned positions on a support means, each array having a charge accumulation portion including a plurality of photosensitive cell means extending in an image plane over a particular charge accumulation distance, each cell means including means for generating an electrical charge having a magnitude that is proportional to the intensity of incident light, means for causing different categories of optical information to be present at respective arrays in said image plane when an image of said at least a part of said object is formed on said plane, means for forming an image of said at least a part of said object on said image plane, having image portions which correspond to different portions of said at least a part of said object incident on different of said arrays, means for scanning each of said image portions which together comprise said image of said at least said part of said object in said image plane in a charge accumulation direction, successively over the charge accumulation distances of each of said arrays, and means for moving the electrical charges generated at each array synchronously with the associated scanning image portions.

2. The imaging apparatus of claim 1, wherein said different categories of optical information are the different colors of said object, and wherein each of said at least two arrays has a charge accumulation distance inversely proportional to the sensitivity of the array to the color of the light which is caused to be present thereat.

3. The imaging apparatus of claim 1, wherein said different categories of optical information are the different colors of said object, and wherein each of said at least two imaging arrays has a charge accumulation distance defining a particular spectral emphasis for the light which is caused to be present thereat.

4. The imaging apparatus of claim 1 wherein said imaging arrays are charge coupled devices and said support means is a single chip.

5. The imaging apparatus of claim 1 wherein each of said imaging arrays is a separate charge coupled device and said support means is a substrate supporting the charge coupled devices in an aligned relation.

6. The imaging apparatus of claim 1, wherein said means for causing different categories of optical information to be present at each array includes a plurality of filters, each filter having means for receiving a white light image of said at least a part of said object and transmitting a component image having a characteristic wavelength of light.

7. The imaging apparatus of claim 6 wherein said filters are red, green and blue.

8. The imaging apparatus of claim 1, wherein said means for causing different categories of optical information to be present at each array includes a light dispersing means for irradiating said at least a portion of said object with an illuminating band of color dispersed light and means for focusing portions of the reflected light of said illuminating band at fixed positions on corresponding imaging arrays.

9. The imaging apparatus of claim 8 wherein said light dispersing means includes a prism.

10. The imaging apparatus of claim 8 wherein said light dispersing means includes a grating.

11. The imaging apparatus of claim 1, wherein said means for causing different categories of optical information to be present at each array includes focusing means for generating a focused image of said at least a part of said object and defocusing means for generating a defocused image of said at least a part of said object.

12. The apparatus of claim 1, wherein said means for scanning includes means for moving said at least a part of an object with respect to said imaging arrays.

13. Facsimile imaging apparatus for generating electrical signals corresponding to the color components of a polychromatic image, comprising:

source means for generating white light;

dispersing means for receiving said white light and transmitting an associated band of color dispersed light comprised of a plurality of sub-bands of different colors to illuminate at least a portion of an object;

detector means having at least two adjacent light detecting elements, each element including means for generating an electrical signal corresponding to the intensity of incident light;

focusing means for receiving the color dispersed band of light that is reflected from said object and focusing respective sub-bands thereof on respective ones of said at least two light detecting elements, and scanning means for moving said band of color dispersed light relative to said object in at least one scanning direction.

14. The facsimile apparatus of claim 13 wherein each of said light detecting elements of said detector means is a charge coupled device imaging array.

15. The facsimile apparatus of claim 14 including support means for mounting said charge coupled device imaging arrays in an aligned relation.

16. The facsimile apparatus of claim 14 including,
- a first imaging array positioned to receive a red light sub-band of the reflected band of color dispersed light,
- a second imaging array positioned to receive a green light sub-band of the reflected band of color dispersed light, and
- a third imaging array positioned to receive a blue light sub-band of the reflected band of color dispersed light.

17. The facsimile apparatus of claim 14 wherein each of said imaging arrays has a charge accumulation portion including a plurality of cell means extending over a particular charge accumulation distance, each cell means including means for generating an electrical charge having a magnitude that is proportional to the intensity of incident light.

18. The facsimile apparatus of claim 17 including means for moving the electrical charges generated at the cell means of each imaging array synchronously with the relative scanning movement of said band of color dispersed light.

19. The facsimile apparatus of claim 18 wherein each of said imaging arrays has a charge accumulation distance that is inversely proportional to the sensitivity of the array to the particular wavelength of its illuminating light.

20. The facsimile apparatus of claim 13 wherein said dispersing means is a prism.

21. The facsimile apparatus of claim 13 wherein said dispersing means is a grating.

22. The facsimile apparatus of claim 18 wherein each of said imaging arrays has a charge accumulation distance defining a particular spectral emphasis for the light incident on the array.

* * * * *

UNITED STATES PATENT AND TRADEMARK OFFICE
CERTIFICATE OF CORRECTION

PATENT NO. : 4,264,921
DATED : April 28, 1981
INVENTOR(S) : Pennington et al

It is certified that error appears in the above—identified patent and that said Letters Patent is hereby corrected as shown below:

Col. 1, line 14, delete "2,422,788" and insert --2,422,778--;

Col. 1, line 15, delete "generte" and insert --generate--.

Col. 3, line 61, delete "pacckets" and insert --packets--.

Col. 6, line 1, delete "mutli-" and insert --multi--.

Signed and Sealed this

Thirteenth Day of October 1981

[SEAL]

Attest:

GERALD J. MOSSINGHOFF

Attesting Officer

Commissioner of Patents and Trademarks